(12) United States Patent
Farjadrad et al.

(10) Patent No.: US 8,891,595 B1
(45) Date of Patent: *Nov. 18, 2014

(54) ELECTROMAGNETIC INTERFERENCE REDUCTION IN WIRELINE APPLICATIONS USING DIFFERENTIAL SIGNAL COMPENSATION

(71) Applicant: Aquantia Corporation, Milpitas, CA (US)

(72) Inventors: Ramin Farjadrad, Los Altos, CA (US); Michael Brown, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/790,333

(22) Filed: Mar. 8, 2013

Related U.S. Application Data

(63) Continuation-in-part of application No. 13/111,785, filed on May 19, 2011, now Pat. No. 8,724,678.

(60) Provisional application No. 61/349,492, filed on May 28, 2010.

(51) Int. Cl.
*H04B 1/38* (2006.01)
*H04B 1/04* (2006.01)

(52) U.S. Cl.
CPC .................................. *H04B 1/0475* (2013.01)
USPC .......................................... 375/219; 375/257

(58) Field of Classification Search
USPC ......... 375/219, 220, 222, 257, 258, 259, 285, 375/295, 346, 377; 327/28, 30, 65, 108, 327/110; 455/67.11, 67.13, 63.1, 114.2, 455/115.1, 226.1, 232.1
See application file for complete search history.

(56) References Cited

U.S. PATENT DOCUMENTS

| | | | |
|---|---|---|---|
| 3,506,906 A | 4/1970 | Nestor |
| 3,671,859 A | 6/1972 | Miller |
| 4,797,902 A | 1/1989 | Nishiguchi et al. |
| 4,870,370 A | 9/1989 | Hedberg et al. |
| 5,157,690 A | 10/1992 | Buttle |
| 5,283,811 A | 2/1994 | Chennakeshu et al. |
| 5,550,924 A | 8/1996 | Helf et al. |
| 5,777,692 A | 7/1998 | Ghosh |
| 5,832,032 A | 11/1998 | Overbury |

(Continued)

FOREIGN PATENT DOCUMENTS

| WO | WO 97/40587 | 10/1997 |
|---|---|---|
| WO | WO 2011/056970 A2 | 5/2011 |

OTHER PUBLICATIONS

U.S. Appl. No. 12/563,938, filed Sep. 21, 2009, Sedarat.
U.S. Appl. No. 12/604,323, filed Oct. 22, 2009, Sedarat et al.

(Continued)

*Primary Examiner* — Dac Ha
(74) *Attorney, Agent, or Firm* — Lance Kreisman; Peninsula Patent Group

(57) ABSTRACT

An integrated circuit device is disclosed. The integrated circuit device includes a differential driver to generate a differential signal having true and complement signal components that exhibit a relative timing relationship. A transmission port provides an interface for delivering the differential signal to a transmission medium. A common mode detection circuit detects a common mode signal associated with the differential signal. Control circuitry generates a control signal based on the detected common mode signal. Timing circuitry adjusts the relative timing between the true and the complement signal components based on the control signal.

20 Claims, 11 Drawing Sheets

(56) References Cited

U.S. PATENT DOCUMENTS

| | | |
|---|---|---|
| 5,889,511 A | 3/1999 | Ong et al. |
| 5,910,960 A | 6/1999 | Claydon et al. |
| 5,995,566 A | 11/1999 | Rickard et al. |
| 5,995,567 A | 11/1999 | Cioffi et al. |
| 6,011,508 A | 1/2000 | Perreault et al. |
| 6,035,360 A | 3/2000 | Doidge et al. |
| 6,052,420 A | 4/2000 | Yeap et al. |
| 6,069,917 A | 5/2000 | Werner et al. |
| 6,285,718 B1 | 9/2001 | Reuven |
| 6,385,315 B1 | 5/2002 | Viadella et al. |
| 6,424,234 B1 | 7/2002 | Stevenson |
| 6,486,746 B1 | 11/2002 | Gilbert |
| 6,683,913 B1 | 1/2004 | Kantschuk |
| 6,690,739 B1 | 2/2004 | Mui |
| 6,711,207 B1 | 3/2004 | Amrany et al. |
| 6,734,659 B1 | 5/2004 | Fortner |
| 6,771,720 B1 | 8/2004 | Yang et al. |
| 6,924,724 B2 | 8/2005 | Grilo et al. |
| 6,934,345 B2 | 8/2005 | Chu et al. |
| 6,959,056 B2 | 10/2005 | Yeap et al. |
| 6,999,504 B1 | 2/2006 | Amrany et al. |
| 7,026,730 B1 | 4/2006 | Marshall et al. |
| 7,031,402 B2 | 4/2006 | Takada |
| 7,103,013 B1 | 9/2006 | Kim et al. |
| 7,123,117 B2 | 10/2006 | Chen et al. |
| 7,164,764 B2 | 1/2007 | Zimmerman et al. |
| 7,173,992 B2 | 2/2007 | Frigon |
| 7,180,940 B2 | 2/2007 | Li et al. |
| 7,200,180 B2 | 4/2007 | Verbin et al. |
| 7,315,592 B2 | 1/2008 | Tsatsanis et al. |
| 7,333,603 B1 | 2/2008 | Sallaway et al. |
| RE40,149 E | 3/2008 | Vitenberg |
| 7,440,892 B2 | 10/2008 | Tamura |
| 7,457,386 B1 | 11/2008 | Phanse |
| 7,459,982 B2 | 12/2008 | Miao |
| 7,492,840 B2 | 2/2009 | Chan |
| 7,522,928 B2 | 4/2009 | O'Mahony |
| 7,542,528 B1 | 6/2009 | Cheong |
| 7,593,470 B2 * | 9/2009 | Segaram ............... 375/257 |
| 7,634,032 B2 | 12/2009 | Chu et al. |
| 7,656,956 B2 | 2/2010 | King |
| 7,706,434 B1 | 4/2010 | Farjadrad |
| 7,708,595 B2 | 5/2010 | Chow et al. |
| 7,906,994 B2 * | 3/2011 | Bell ..................... 327/108 |
| 8,022,728 B2 * | 9/2011 | Kanda et al. ............ 326/83 |
| 8,094,546 B2 | 1/2012 | Schenk |
| 8,139,602 B2 | 3/2012 | Meier |
| 8,331,508 B2 | 12/2012 | Dabiri |
| 8,472,532 B2 | 6/2013 | Schley-May et al. |
| 8,625,704 B1 | 1/2014 | Sedarat et al. |
| 8,724,678 B2 * | 5/2014 | Farjadrad ............... 375/219 |
| 2003/0186591 A1 | 10/2003 | Jensen et al. |
| 2003/0223488 A1 | 12/2003 | Li et al. |
| 2003/0223505 A1 | 12/2003 | Verbin et al. |
| 2004/0010203 A1 | 1/2004 | Bibian et al. |
| 2004/0023631 A1 | 2/2004 | Deutsch et al. |
| 2004/0164619 A1 | 8/2004 | Parker et al. |
| 2004/0213366 A1 | 10/2004 | Ono |
| 2004/0239465 A1 | 12/2004 | Chen et al. |
| 2004/0252755 A1 | 12/2004 | Jaffe et al. |
| 2004/0257743 A1 | 12/2004 | Chen et al. |
| 2005/0018777 A1 | 1/2005 | Azadet |
| 2005/0025266 A1 | 2/2005 | Chan |
| 2005/0053229 A1 | 3/2005 | Tsatsanis et al. |
| 2005/0097218 A1 | 5/2005 | Sultenfuss et al. |
| 2005/0123081 A1 | 6/2005 | Shirani |
| 2005/0135489 A1 | 6/2005 | Ho et al. |
| 2005/0203744 A1 | 9/2005 | Tamura |
| 2005/0243483 A1 | 11/2005 | Chen et al. |
| 2006/0018388 A1 | 1/2006 | Chan |
| 2006/0056503 A1 | 3/2006 | Keshab et al. |
| 2006/0159186 A1 | 7/2006 | King |
| 2006/0182014 A1 | 8/2006 | Lusky et al. |
| 2006/0256880 A1 | 11/2006 | Frisch |
| 2007/0014378 A1 | 1/2007 | Parhi et al. |
| 2007/0081475 A1 | 4/2007 | Telado et al. |
| 2007/0146011 A1 | 6/2007 | O'Mahony et al. |
| 2007/0192505 A1 | 8/2007 | Dalmia |
| 2007/0258517 A1 | 11/2007 | Rollings et al. |
| 2007/0280388 A1 | 12/2007 | Torre et al. |
| 2008/0089433 A1 | 4/2008 | Cho et al. |
| 2008/0095283 A1 | 4/2008 | Shoor |
| 2008/0107167 A1 | 5/2008 | Tung et al. |
| 2008/0160915 A1 | 7/2008 | Sommer et al. |
| 2008/0198909 A1 | 8/2008 | Tsatsanis et al. |
| 2008/0267212 A1 | 10/2008 | Crawley et al. |
| 2009/0061808 A1 | 3/2009 | Higgins |
| 2009/0097401 A1 | 4/2009 | Diab |
| 2009/0097539 A1 | 4/2009 | Furman et al. |
| 2009/0154455 A1 | 6/2009 | Diab |
| 2009/0161781 A1 | 6/2009 | Kolze |
| 2010/0046543 A1 | 2/2010 | Parnaby |
| 2010/0073072 A1 | 3/2010 | Ullen et al. |
| 2010/0074310 A1 | 3/2010 | Roo et al. |
| 2010/0086019 A1 | 4/2010 | Agazzi et al. |
| 2010/0111202 A1 | 5/2010 | Schley-May et al. |
| 2010/0159866 A1 | 6/2010 | Fudge et al. |
| 2011/0032048 A1 | 2/2011 | Wu et al. |
| 2011/0069794 A1 | 3/2011 | Tavassoli Kilani et al. |
| 2011/0106459 A1 | 5/2011 | Chris et al. |
| 2011/0212692 A1 | 9/2011 | Hahn |
| 2011/0256857 A1 | 10/2011 | Chen et al. |
| 2011/0293041 A1 | 12/2011 | Luo et al. |
| 2011/0296267 A1 | 12/2011 | Malkin et al. |

OTHER PUBLICATIONS

U.S. Appl. No. 12/604,343, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.
U.S. Appl. No. 12/977,844, filed Dec. 23, 2010, Sedarat.

* cited by examiner

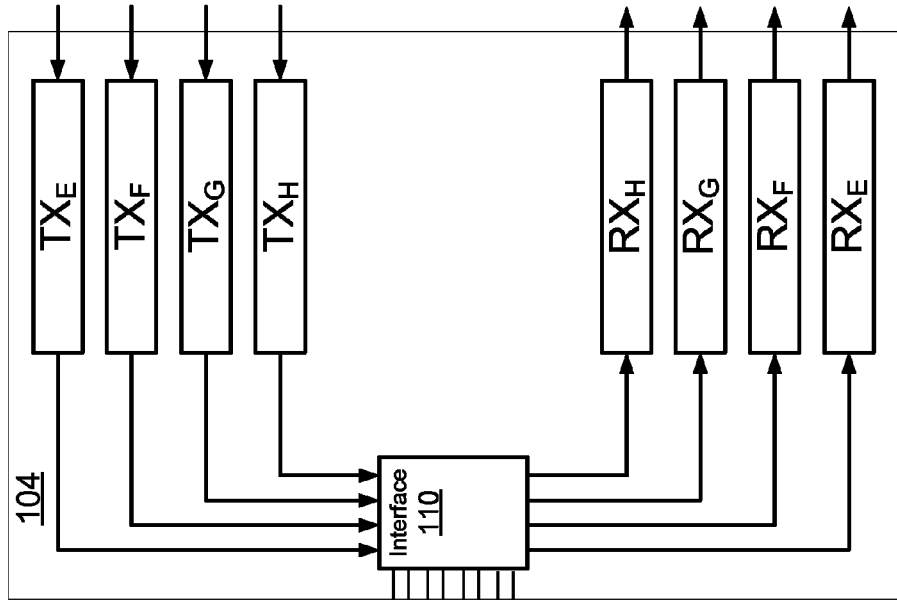
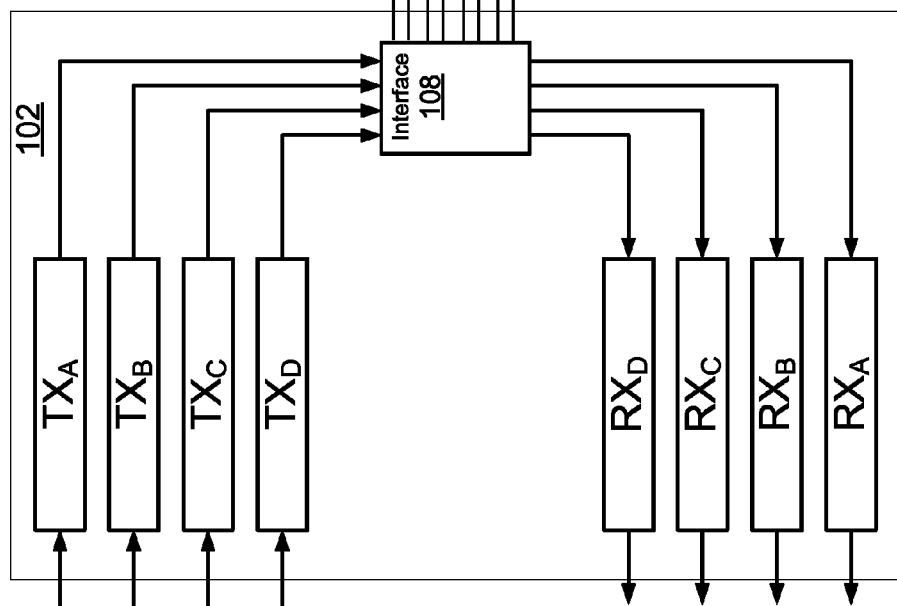
FIG. 1

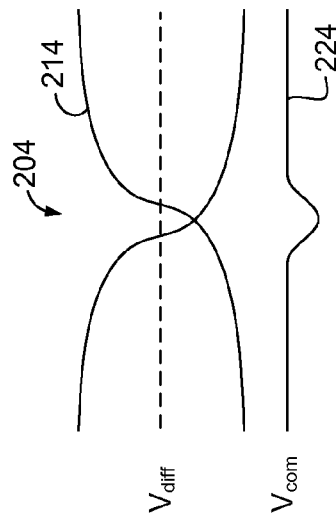
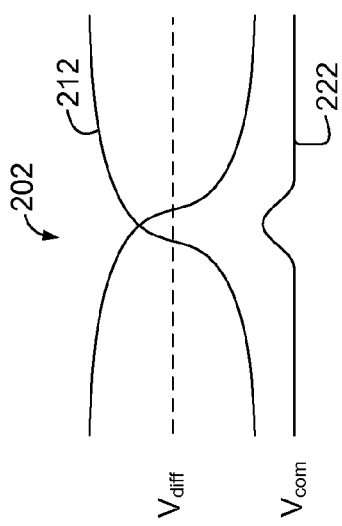
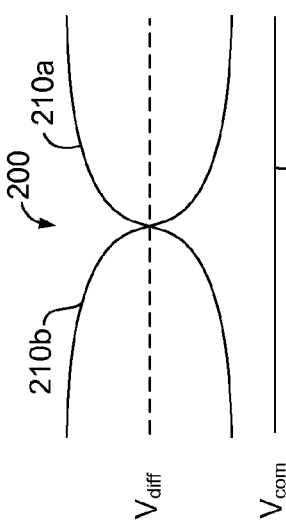
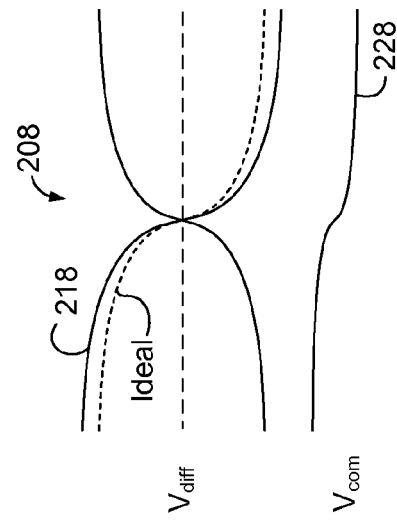
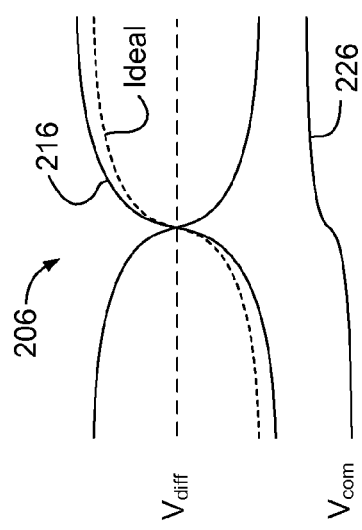

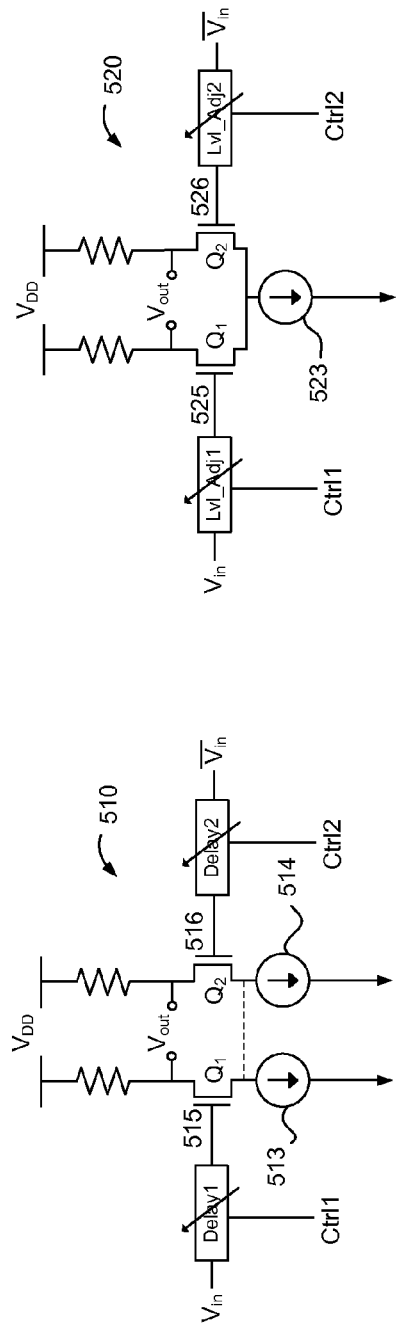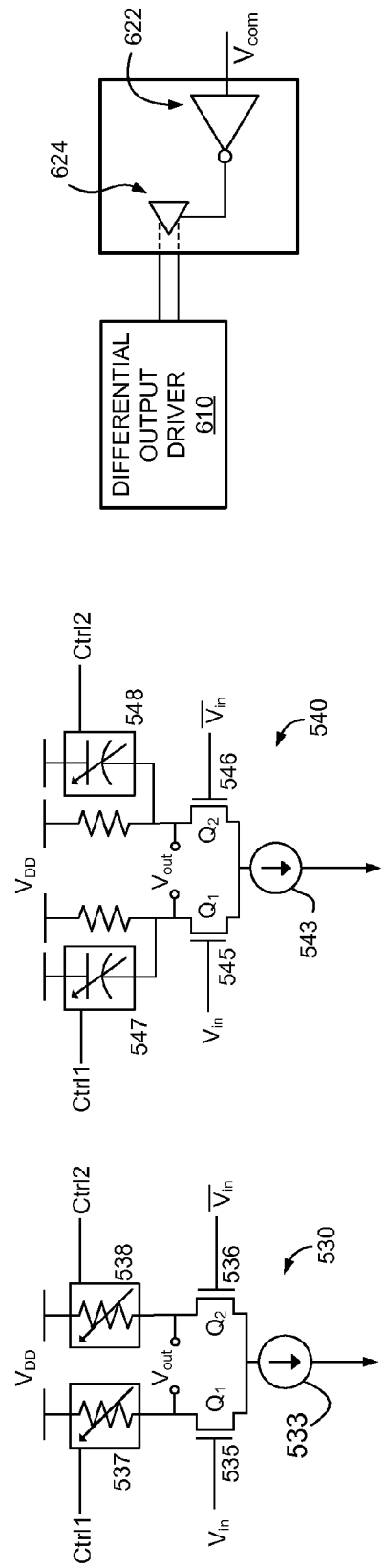
FIG. 5B
FIG. 6
FIG. 5A
FIG. 5D
FIG. 5C

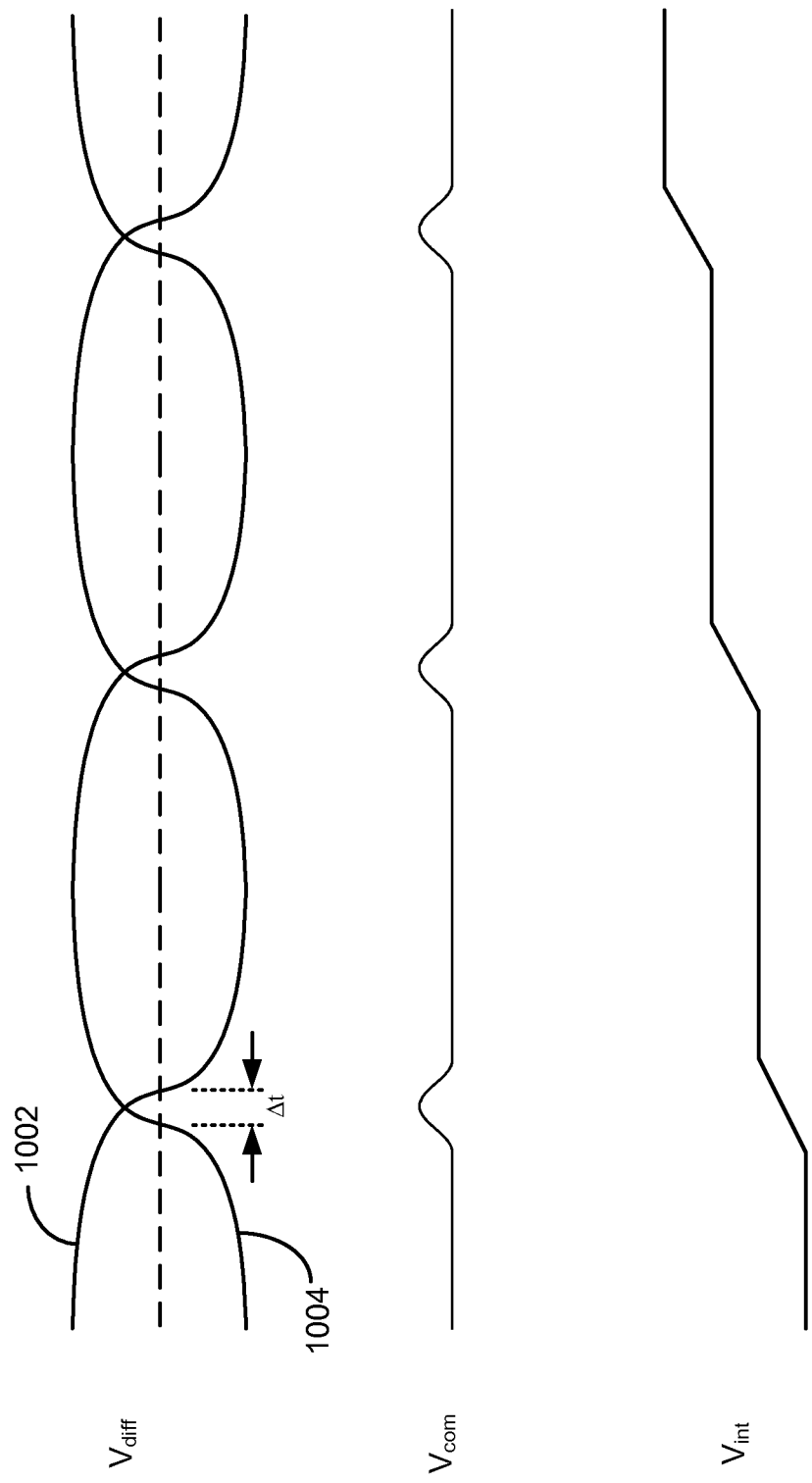

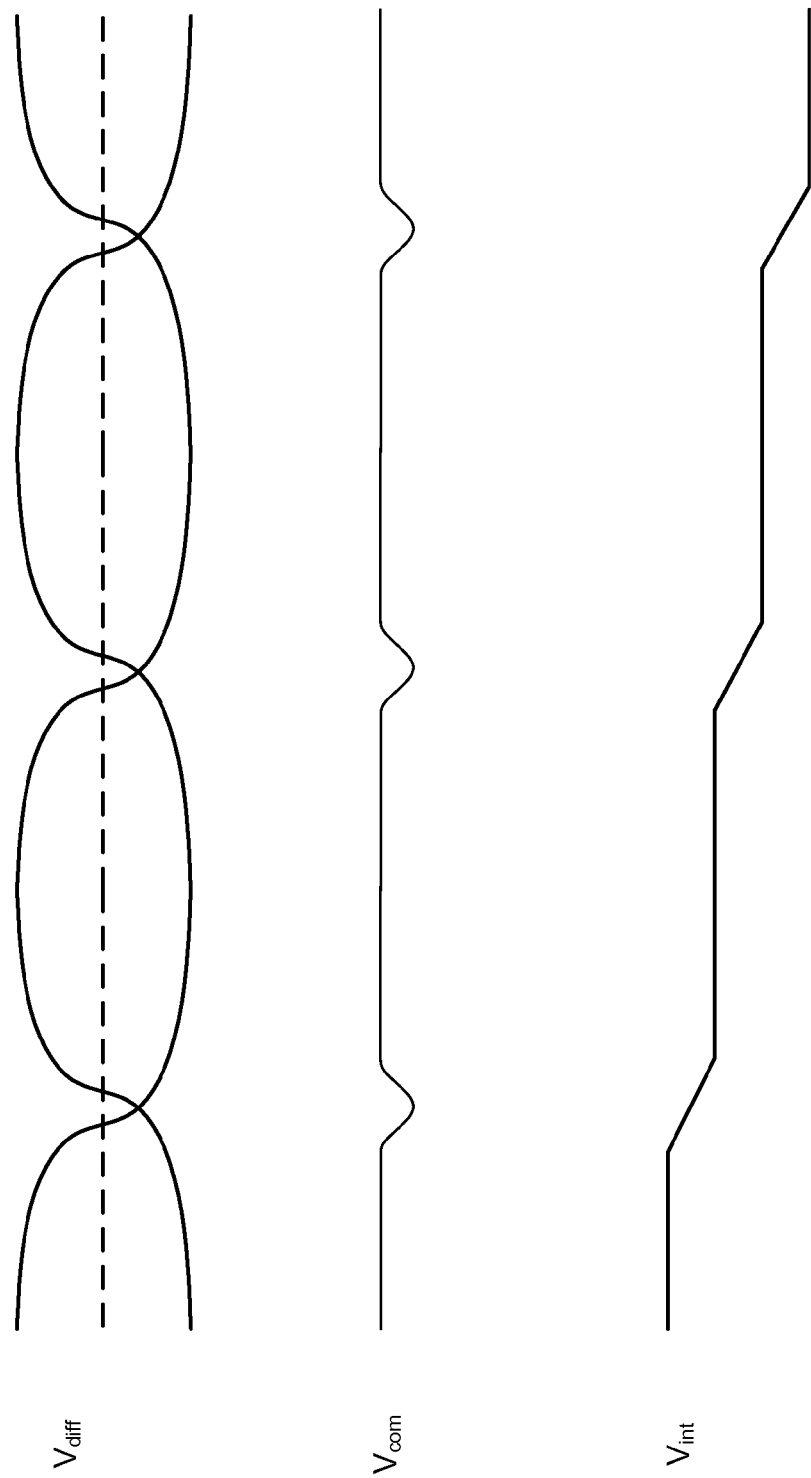

ELECTROMAGNETIC INTERFERENCE REDUCTION IN WIRELINE APPLICATIONS USING DIFFERENTIAL SIGNAL COMPENSATION

CROSS REFERENCE TO RELATED APPLICATIONS

This application is a Continuation-In-Part of U.S. application Ser. No. 13/111,785, filed May 19, 2011, and entitled "Electromagnetic Emission Reduction in Wireline Applications Using Differential Signal Imbalancing," which claims the benefit under 35 U.S.C. Sec. 119(e) of the and commonly owned U.S. Provisional Application No. 61/349,492, filed May 28, 2010, and entitled "Electromagnetic Emission Reduction in Wireline Applications Using Differential Signal Imbalancing," the disclosures of which are incorporated by reference in their entirety.

TECHNICAL FIELD

The disclosure herein relates to electronic communications, and more particularly to mitigating imbalance in transceiver circuitry and interference in signals transmitted over communication channels.

BACKGROUND

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from the link. The receiver detects transmitted data from a link partner transceiver on the opposite end of the link and converts the data into a form usable by the system connected to the transceiver. For example, one widely-used network communication standard is Ethernet, including several different standards for different network bandwidths, including 10 GBASE-T allowing 10 gigabit/second connections over unshielded or shielded twisted pair cables.

There are multiple sources of impairment and interference in a 10 GBASE-T system which can cause significant performance degradation. These sources of impairment and interference can be broadly categorized as internal and external sources. The internal sources are caused by the link partners themselves and imperfect channel characteristics. Some examples of these sources are inter-symbol interference (ISI), echo and pair-to-pair cross-talk such as far-end crosstalk (FEXT) and near-end crosstalk (NEXT). Other examples of internal interference include differential skew between the two differential signal components in the channel (e.g., imbalance in the channels) and driver circuit asymmetry generating different transition for rising and falling edges (e.g., imbalance of the differential drivers). Typical causes of imbalance in the channels include, for example, unequal stray coupling of the traces (or wireline), differences between two trace widths, propagation time differences caused by woven printed circuit board (PCB) substrate, change in PCB layer and coating on micro-strips, transformer unequal windings for the two differential signal components, and crimping of the wires in the plug and in connection to connectors. Typical causes of imbalance of the differential drivers include, for example, termination impedance mismatch, and differential switching circuitry not having the same response for the respective falling and rising edges.

In some cases, differential signal imbalance may lead to levels of common-mode that cause undesirable RF emissions during signal transmissions along the channel. Transceiver designs often must meet stringent Federal Communications Commission (FCC) rules and regulations regarding spurious emissions in order to avoid interfering with other communications equipment. Thus, common-mode problems should be periodically addressed to properly stay within FCC guidelines.

Accordingly, in order to reach the desired performance of high bandwidth communication systems, it would be desirable to have systems and methods that compensate for differential signal imbalances in communication system transceiver circuitry, providing more robust communication in such systems, and maintaining FCC compliance.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 1 illustrates a block diagram of one embodiment of a high-level 10 GBASE-T transceiver architecture;

FIG. 2A illustrates an ideal case of a balanced differential signal with a flat common mode signal;

FIG. 2B illustrates an example of a differential signal experiencing one type of noise interference and its associated common mode signal;

FIG. 2C illustrates an example of an adjusted differential signal with a signal characteristic opposite to the interfered signal of FIG. 2B;

FIG. 2D illustrates an example of a differential signal experiencing another type of noise interference and its associated common mode signal;

FIG. 2E illustrates an example of an adjusted differential signal with a signal characteristic opposite to the interfered signal of FIG. 2D;

FIGS. 5A, 5B, 5C, and 5D illustrate various detailed embodiments of the compensator circuit of FIG. 4;

FIG. 6 illustrates a further embodiment of a compensator circuit similar to the embodiments shown in FIGS. 5A-5D;

FIG. 10A illustrates a timing diagram showing how an accumulating integrator waveform is generated when a detected common-mode is positive;

FIG. 10B illustrates a timing diagram showing how an accumulating integrator waveform is generated when a detected common-mode is negative.

DETAILED DESCRIPTION

Figure 3:
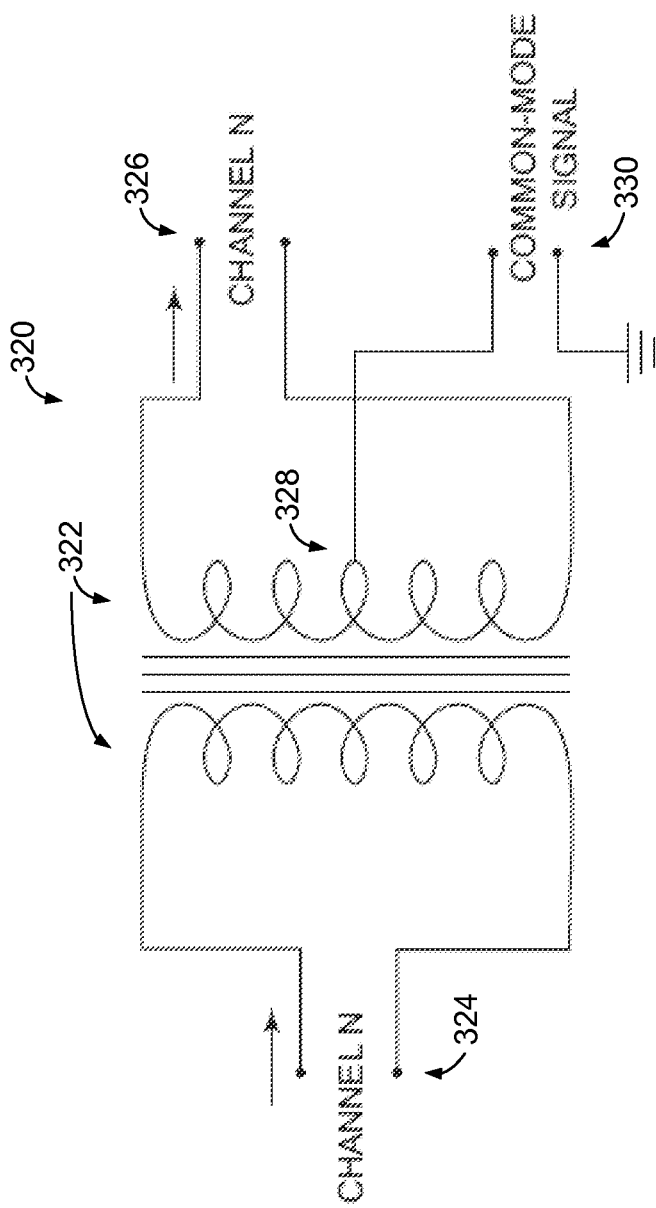
FIG. 3 illustrates an embodiment of a common mode signal detector to provide a common mode signal in a communication system to allow interference caused by a noise source to be determined.

Embodiments of an integrated circuit device are disclosed. One embodiment of the integrated circuit device includes a differential driver to generate a differential signal having true and complement signal components that exhibit a relative timing relationship. A transmission port coupled to the output of the differential driver provides an interface for delivering the differential signal to a transmission medium. A common mode detection circuit detects a common mode signal associated with the differential signal. Control circuitry generates a control signal based on the detected common mode signal. Timing circuitry adjusts the relative timing between the true and the complement signal components based on the control signal. By providing common mode detection circuitry on-chip, additional interface ports for accessing the chip may be minimized.

In yet another embodiment, a method of reducing radio frequency interference (RFI) emitted by a differential driver is disclosed. The method includes generating a differential signal having a true signal component and a complement signal component for transmission along a transmission medium. A level of common mode associated with the generated differential signal is detected prior to transmission on the medium and a signal generated indicative of the detected level. The detected common mode signal is accumulated with previously detected common mode signals to generate a running accumulation value. The running accumulation value is compared to a predetermined threshold and a relative timing adjusted between the true signal component and the complement signal component if the predetermined threshold is exceeded.

FIG. 1 is a block diagram illustrating one embodiment of a 10 GBASE-T communication system 100 suitable for use with embodiments described herein. The system 100 includes a first transceiver integrated circuit (IC) or chip 102 and a second transceiver chip 104 that can communicate with each other. The first transceiver 102 includes "transceiver components" including one or more transmitters $TX_A$-$TX_A$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels on which a transmitter block within the transceiver can independently transmit signals. Similarly, receivers $RX_A$-$RX_H$ can be considered individual "receivers," as typically referenced herein, or can alternately be considered individual receiver channels on which a receiver block within the transceiver can independently receive signals. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as that corresponding to the 10 GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example, from the point of view of the first transceiver chip 102, data transmissions during normal operation from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Filters can be used to filter out this noise so that the receivers receive only data from other transceivers. In some examples, the transceivers 102 and 104 are asymmetric, such that data transmitted by a local transmitter has no dependence or relation with data being received by the corresponding local receiver.

As previously mentioned, interference can be categorized by noise source into two categories, external (or alien) and internal. Interference can also be categorized by the signal characteristic it affects, for example, timing and amplitude. Of course, interference that affects the same type of signal characteristic can result from different noise sources, and interference that affects different types of signal characteristics can result from the same noise source. A typical result from internal interference is an imbalance in the transceiver circuitry. On the other hand, a typical result of alien interference is an imbalance in the channels. Other sources may include RFI or cross-talk, as discussed above.

FIG. 2A illustrates an ideal balanced differential signal 200 with a flat common mode signal 220. A common mode signal 220 is the summation of two differential signal components 210a and 210b, which collectively represent a differential signal 220. In an ideal case such as shown in FIG. 2A, the two differential signal components 210a and 210b are perfectly complementary to each other so that their corresponding common mode signal 220 remains flat, with a zero offset. If, for example, a circuit imbalance affects both of the two differential signal components 210a and 210b equally, then the corresponding common mode signal 220 still remains flat, and the effect of the imbalance can be readily suppressed via well-known methods. If, however, the common mode signal 220 is a non-flat curve, then it indicates an imbalance having different levels of impact on each of the two differential signal components 210a and 210b. Any non-flat common mode signal is undesirable as such an imbalance often requires further processing to reduce its effect.

FIG. 2B illustrates an example of a differential signal 202 experiencing a timing type of imbalance and its associated common mode signal 222. As shown in FIG. 2B, one or both of the two differential signal components (e.g., differential signal component 212) of the differential signal 202 is shifted in time with respect to one another (e.g., from an internal imbalance in the channel) so that the two components are no longer completely complementary. The common mode signal 222 corresponding to differential signal 202, therefore, manifests a protrusion near the center point where the two differential components cross over each other.

FIG. 2C illustrates an example of an adjusted differential signal 204 with a signal characteristic opposite to the interfered differential signal 202 of FIG. 2B. In FIG. 2C, adjusted differential signal 204 is shown to be deliberately adjusted, by circuitry more fully described below, to have a signal characteristic that is directly complementary to the differential signal 202 of FIG. 2B in order to compensate the imbalance. The common mode signal 224 corresponding to adjusted differential signal 204, therefore, shows a depression near the center point where the two differential components cross over each other, and is complementary to the common mode signal 222 of FIG. 2B. After experiencing the same imbalance (e.g., the same imbalance in the channels) experienced by the differential signal 202 of FIG. 2B, the adjusted differential signal 204 of FIG. 2C can become a balanced differential signal (e.g., differential signal 200 of FIG. 2A). In this manner, the adjusted differential signal 204 of FIG. 2C "compensates" the imbalance experienced by the differential signal 202 of FIG. 2B. Adjusted differential signal 204 can be generated based upon the common mode signal 224 of FIG. 2C, which is a complementary signal of the common mode signal 222 detected in FIG. 2B.

FIG. 2D illustrates an example of a differential signal 206 experiencing an amplitude type of imbalance and its associated common mode signal 226. As shown in FIG. 2D, one of the two differential signal components (e.g., differential signal component 216) of the differential signal 206 is skewed with different amplification (e.g., from an imbalance of the differential drivers) so that the two components are not completely complementary to each other anymore. The common mode signal 226 corresponding to differential signal 206, therefore, manifests a curve with a positive slope near the center point where the two differential components cross over each other.

FIG. 2E illustrates an example of an adjusted differential signal 208 with a signal characteristic opposite to the interfered differential signal 206 of FIG. 2D. In FIG. 2E, adjusted differential signal 208 is shown to be deliberately adjusted, with circuitry described more fully below, to have a signal characteristic that is directly complementary to the differential signal 206 of FIG. 2D in order to compensate the imbalance. The common mode signal 228 corresponding to adjusted differential signal 208, therefore, shows a curve with a negative slope near the center point where the two differential components cross over each other, and is complementary to the common mode signal 226 of FIG. 2D. After experiencing the same imbalance (e.g., the same imbalance in the differential drivers) experienced by the differential signal 206 of FIG. 2D, the adjusted differential signal 208 of FIG. 2E can become a balanced differential signal (e.g., differential signal 200 of FIG. 2A). In this manner, the adjusted differential signal 208 of FIG. 2E "compensates" the imbalance experienced by the differential signal 206 of FIG. 2D. Adjusted differential signal 208 can be generated based upon the common mode signal 228 of FIG. 2C, which is a complementary signal of the common mode signal 226 detected in FIG. 2D.

FIG. 3 illustrates an embodiment of a common mode signal detector 320 to provide a common mode signal in a communication system to allow a differential signal imbalance to be determined and compensated. In many embodiments, the common mode signal may be directly measured from a transmission channel. In other embodiments, the common mode signal 330 may be measured from a near-end transmission port.

Further referring to FIG. 3, the common-mode signal detector detects the common mode signal from a link transformer. In many twisted-pair link communication systems, a coupling transformer 322 is provided at the connection point of a transceiver for each communication channel in the link. Typically, an isolation transformer is provided at both a transmitter end of each channel and at a receiver end of each channel (here, the receiver end is shown), to provide, for example, DC isolation, common mode rejection, impedance matching between dedicated drivers of the transmitter and the impedance of the cable, and balanced data transfer over the cable of the channel.

The embodiment illustrated in FIG. 3 is typically known as a "center-tap transformer," although any other suitable methods or apparatus to detect a common mode signal can be used consistent with the principles described herein. As shown in FIG. 3, one way to pick up the common mode signal from channel N is from an interference tap, which in one embodiment is a center tap 328 of the coupling transformer 322. The common mode signal is provided on terminals 330, one terminal connected to the center tap 328 and the other terminal connected to ground. This common mode signal can act as a reference signal, such as the common mode signal 222 of FIG. 2B or the common mode signal 226 of FIG. 2D. Thus, the detected common mode signal on terminals 330 can be provided to suitable compensator circuits or filters (described in more details below) to suppress imbalance experienced by communication channels in the communication system 100 of FIG. 1.

Although not shown in FIG. 3, an additional receiver path may be provided to sense the common mode signal on a receive data channel, where the additional receiver path is referred to herein as a "common mode path." The common mode path is in addition to any existing receiver paths used for data communication. For example, in a typical 10 GBASE-T system, four receiver paths are used for data communication, one connected to each channel. Channel N is used for tapping the common mode noise signal as shown in FIG. 3, and can be any one of the existing communication channels. In one embodiment, the common mode path is a fifth receiver path used to receive and process the common mode signal in determining imbalance. In the described embodiment, the communication channel N is connected to the transformer in the usual way. Thus, as shown in FIG. 3, the communication link is connected to the channel N differential terminals 324, which are connected to an input at one side of the transformer. The channel N differential terminals 326 are connected to a corresponding output at the other side of the transformer 322. The differential channel N terminals 326 are also connected to the standard receiver components to which the usual differential channels are connected.

Figure 4:
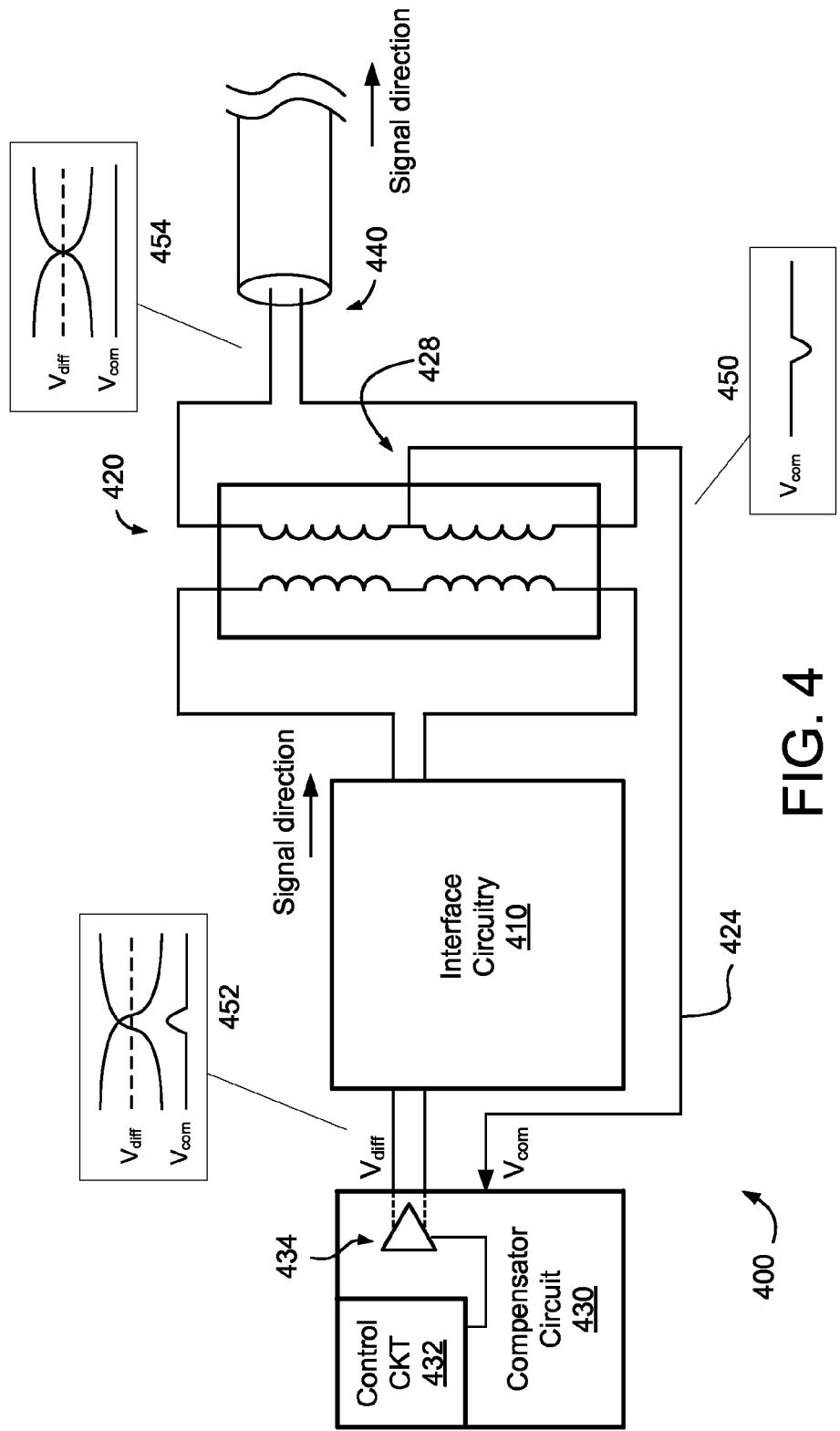
FIG. 4 illustrates one embodiment of a transceiver employing a compensator circuit for interference compensation.

FIG. 4 illustrates one embodiment of a transceiver circuit 400 employing a compensator circuit 430 for imbalance compensation. In accordance with embodiments, transceiver 400 includes interface circuitry 410, a common mode signal detection circuit 420, a compensator circuit 430, and transmission port 440. For simplicity, only the transmitter part of the transceiver 400 is shown in FIG. 4. Other parts of a typical transceiver including, for example, the receiver part of the transceiver 400 and other well-known elements in a transceiver system are not shown. For the embodiment illustrated in FIG. 4, the common mode signal detection circuit 420 is placed on the transmitter end. This configuration is generally suitable for detection and compensation of imbalance in the interface circuitry 410. For other embodiments, common mode signal detection circuit 420 can be placed on the receiver end (not shown) for detection and compensation of differential imbalance in the communication channels.

The interface circuitry 410 generally represents the circuit path that a differential signal, after being generated by a differential driver 434, travels through before arriving transmission port 440. Thus, the interface circuitry 410 may include any wiring that the differential signal traverses before reaching the communication channel including, for example, wiring inside the transceiver IC packaging, filters, or even the printed circuit board on which the transceiver IC is mounted.

Further referring to FIG. 4, the common mode signal detection circuit 420 is structured the same and functions substantially in the same manner as the common mode signal detector 320 of FIG. 3. Common mode signal detection circuit 420 detects imbalance in a differential signal transmitted from interface circuitry 410 and generates a common mode signal on a center tap 428. From center tap 428, common mode signal detection circuit 420 feeds the common mode signal to compensator circuit 430 through a common mode path 424. The advantage of sensing the common-mode signal at the line side of the common-mode detector 420 is that the compensator can also compensate for any imbalances in the signal path from the transmitter through the interface all the way to the connection point of the channel. Common mode signal detection circuit 420 also comprises another terminal for the differential signal to pass through to transmission port 440, which in turn is connected to the communication channels.

With continued reference to FIG. 4, the compensator circuit 430 includes an input to receive the common mode signal $V_{com}$ from the common mode path 424, control circuitry 432, and the differential driver 434 that responds to the control circuitry in at least one of several possible ways, as more fully described below. The control circuitry 432 evaluates the detected common-mode signal $V_{com}$ and generates one or more control signals to carry out one more corresponding adjustments to the differential driver circuitry in order to compensate for the differential signal imbalance resulting from the imperfect common mode. In some embodiments, the compensator circuit 430 includes input adjustment circuitry (e.g., embodiments shown in FIGS. 5A and 5B, described in detail below) to pre-adjust a signal characteristic of at least one component of the differential signal based on the common mode signal determined by common mode signal detection circuit 420. In some other embodiments, compensator circuit 430 includes adjustable impedance circuitry (e.g., embodiments shown in FIGS. 5C and 5D, described in detail below) to pre-adjust an impedance characteristic of a corresponding part of differential driver circuitry, on which at least one component of the differential signal is transmitted, based on the common mode signal determined by common mode signal detection circuit 420. In still some other embodiments, compensator circuit 430 includes a filter (e.g., the embodiment shown in FIG. 6, described in detail below) coupled to the differential driver 434, the filter generating a compensation signal based on the received common mode signal. The compensation signal is to be applied onto the original differential signal to reduce or eliminate differential signal imbalance. Depending on the application, an embodiment may have more than one adjustment or filter circuitry to compensate different types of interference.

Together, compensator circuit 430 can dynamically adjust the differential signal output of the differential driver 434 in order to cancel out differential signal imbalance detected by common mode signal detection circuit 420. Different embodiments of adjustment or filter circuitry are discussed with reference to FIG. 5 and FIG. 6 below.

FIGS. 5A, 5B, 5C, and 5D illustrate specific embodiments of the compensator circuit of FIG. 4. In the embodiment of FIG. 5A, compensator circuit 510 includes a first bias current source or bias impedance 513 a second bias current source 514, a first signal input 515 coupled to a first switching device Q1, and a second signal input 516 coupled to a second switching device Q2 matched to the first device Q1 to form what resembles a differential pair. Unlike a typical differential pair, the tail connections for the two matched devices Q1 and Q2 are not coupled together, and thus form a pseudo-differential pair. The first and second signal inputs 515 and 516 each receive respective differential signal components, such as Vin and $\overline{Vin}$. In order to correct for timing imbalance in one or both of the complementary signals, a delay circuit Delay1 may be employed in one of the input paths, such as that shown at 515. Similarly, a second delay circuit Delay2 may be employed in the other input path if desired. Since the matched devices are "decoupled", introducing an extra timing delay to one differential signal component on one input, (e.g., signal input 515) does not affect the response of the other transistor Q2. In this way, when a common mode signal indicates that the transceiver is experiencing a timing interference or imbalance, the control circuit (e.g., control circuitry 432 of FIG. 4) can adjust the timing (e.g., by adjusting the delay circuit Delay1 through a control signal Ctrl1) of at least one of the differential signal components that compose the differential signal to compensate the interference.

In the embodiment of FIG. 5B, compensator circuit 520 includes a bias current source 523, a first signal input 525 coupled to a first MOS transistor Q1, and a second signal input 526 coupled to a second MOS transistor Q2 matched to the first transistor Q1 to form a differential pair. The first and second signal inputs 525 and 526 each receive respective differential signal components, such as Vin and $\overline{Vin}$. In order to correct for level imbalance in one or both of the complementary signals, a level adjustment circuit Lvl_Adj1 may be employed in one of the input paths, such as that shown at 525. Similarly, a second level adjustment circuit Lvl_Adj2 may be employed in the other input path if desired. In this way, when a common mode signal indicates that the transceiver is experiencing a mismatching level imbalance, the control circuit (e.g., control circuitry 432 of FIG. 4) can adjust the signal level (e.g., by adjusting the level adjustment circuit Lvl_Adj1 through a control signal Ctrl1) of at least one of the differential signal components that compose the differential signal to compensate the interference.

In the embodiment of FIG. 5C, compensator circuit 530 includes a bias current source 533, a first signal input 535 coupled to a first MOS transistor Q1, a second signal input 536 coupled to a second MOS transistor Q2 matched to the first transistor Q1 to form a differential pair, a first adjustable resistor 537 to adjust the load resistance on the first transistor Q1, and a second adjustable resistor 538 to adjust the load resistance on the second transistor Q2. The first and second signal inputs 535 and 536 each receive respective differential signal components, such as Vin and $\overline{Vin}$. In order to correct for direct current (DC) amplitude imbalance in one or both of the complementary signals, an adjustable resistor circuit 537 may be coupled to the first transistor Q1 to adjust the DC amplitude thereof. Similarly, a second adjustable resistor circuit 538 may be coupled to the second transistor Q2 to adjust the DC amplitude thereof if desired. In this way, when a common mode signal indicates that the transceiver is experiencing a DC amplitude imbalance, the control circuit (e.g., control circuitry 432 of FIG. 4) can adjust the DC amplitude (e.g., by adjusting the adjustable resistor 537 through a control signal Ctrl1) of at least one of the differential signal components that compose the differential signal to compensate the interference.

In the embodiment of FIG. 5D, compensator circuit 540 includes a bias current source 543, a first signal input 545 coupled to a first MOS transistor Q1, a second signal input 546 coupled to a second MOS transistor Q2 matched to the first transistor Q1 to form a differential pair, a first adjustable capacitor 547 to adjust the load capacitance on the first transistor Q1, and a second adjustable capacitor 548 to adjust the load capacitance on the second transistor Q2. The first and second signal inputs 545 and 546 each receive respective differential signal components, such as Vin and $\overline{\text{Vin}}$. In order to correct for alternating current (AC) response imbalance in one or both of the complementary signals, an adjustable capacitor 547 may be coupled to the first transistor Q1 to adjust the AC response thereof. Similarly, a second adjustable capacitor 548 may be coupled to the second transistor Q2 to adjust the AC response thereof if desired. In this way, when a common mode signal indicates that the transceiver is experiencing an AC response imbalance, the control circuit (e.g., control circuitry 432 of FIG. 4) can adjust the AC response (e.g., by adjusting the adjustable capacitor 547 through a control signal Ctrl1) of at least one of the differential signal components that compose the differential signal to compensate the interference.

It is worth noting that the embodiments illustrated in FIG. 5A-5D generally belong to the mixed analog-digital circuit design regime. The common mode detection circuit is generally categorized in the art as analog circuit design, while the input signal adjustment or load impedance adjustment are generally categorized in the art as digital circuit design. As an alternative, an embodiment of the compensator circuit that involves analog circuit design techniques is disclosed in FIG. 6.

FIG. 6 illustrates another embodiment of the compensator circuit of FIG. 4. The compensator circuit, generally designated 600 includes a differential output driver 610 similar to the output drivers described in FIGS. 5A-5D, but without adjustable circuitry within the driver to pre-compensate for imbalances in the differential signal. A second differential driver 624 feeds a compensation signal for application to the first differential output driver output. The second differential driver responds to the generation of a filtered or inverted common mode signal provided by analog inverter 622. An additional filter may be provided in the circuit depending on the application. The inverter 622 may be coupled to the first differential output driver 610 and receives a common mode signal that is detected by a common mode detection circuit (e.g., circuit 420 of FIG. 4) or by extracting common-mode signal directly from the output differential lines Vout. Then, the analog inverter 622 inverses the common mode signal to become a complemented common mode signal. Thereafter, the second differential pair 624 generates an adjustment differential signal (or a compensation signal) based on the complemented common mode signal, and applies the adjustment differential signal onto the first pair. In this way, when a common mode signal indicates that the transceiver is experience an imbalance, the analog inverter circuit can automatically generate an adjustment differential signal (or a compensation signal) comprising two adjustment differential signal components to pre-compensate for the imbalance.

Figure 7:
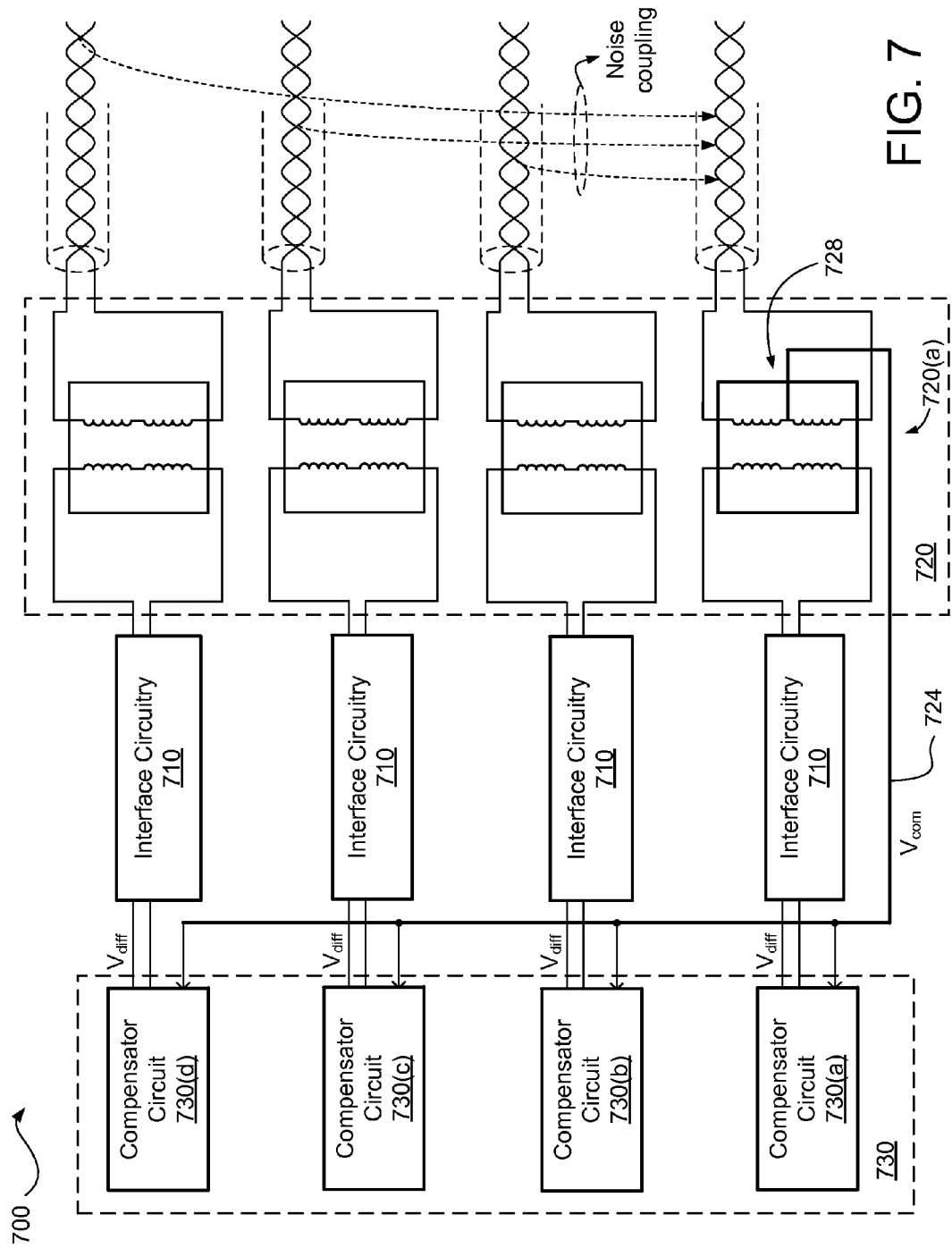
FIG. 7 illustrates an embodiment of a multi-channel transceiver device employing at least one common mode signal detection circuit for interference compensation.

FIG. 7 illustrates an embodiment of a multi-channel transceiver device 700 employing at least one common mode signal detection circuit 720(a) for imbalance compensation. This embodiment is particularly useful for 10 GBASE-T applications, where a transformer is used to couple a transceiver to a communication channel (e.g., an unshielded twisted pair). However, as illustrated in FIG. 1, according to the 10 GBASE-T Ethernet standard, there are four communication channels provided on any given communication link, each channel having a twisted pair cable. Since all four communication channels are physically proximate to each other, there is generally enough common-mode coupling among the four channels so that it is sufficient to utilize one common mode signal detection circuit to generate one common mode signal from one channel for compensation operations of all four channels. Similarly, it is unnecessary to detect common mode signals four times for the same interface circuitry. It is sufficient to detect the common-mode component of each channel coupled to the single common-mode detector once apply the result of the detection for that specific channel one at a time. Therefore, whether an embodiment of FIG. 7 employs compensator circuits to compensate imbalance in the interface circuitry, it is generally enough to utilize one common mode signal detection circuit, the result of which being shared with all four compensator circuits.

Further referring to FIG. 7, an embodiment is shown to employ one common mode signal detection circuit 720(a) to generate a common mode signal on a common mode path 724. The common mode signal detection circuit 720(a) uses a center tap 728 to pick up noise interference in interface circuitry 710. Then, the common mode signal is sent to each of four compensator circuits 730(a)-730(d). In this way, compensator circuits 730 can make adjustments (in the manner described above) according to the common mode signal received to compensate imbalance detected. In the embodiment of FIG. 7, only the transmitter part of the transceiver is shown. Of course, in other embodiments such as the ones to be applied on the receiver part of the transceiver, the common mode signal detection circuit 720(a) can use the center tap 728 to pick up noise interference in an associated communication channel, and the compensator circuits 730 can respond to the noise interference detected to suppress the imbalance accordingly.

Figure 8:
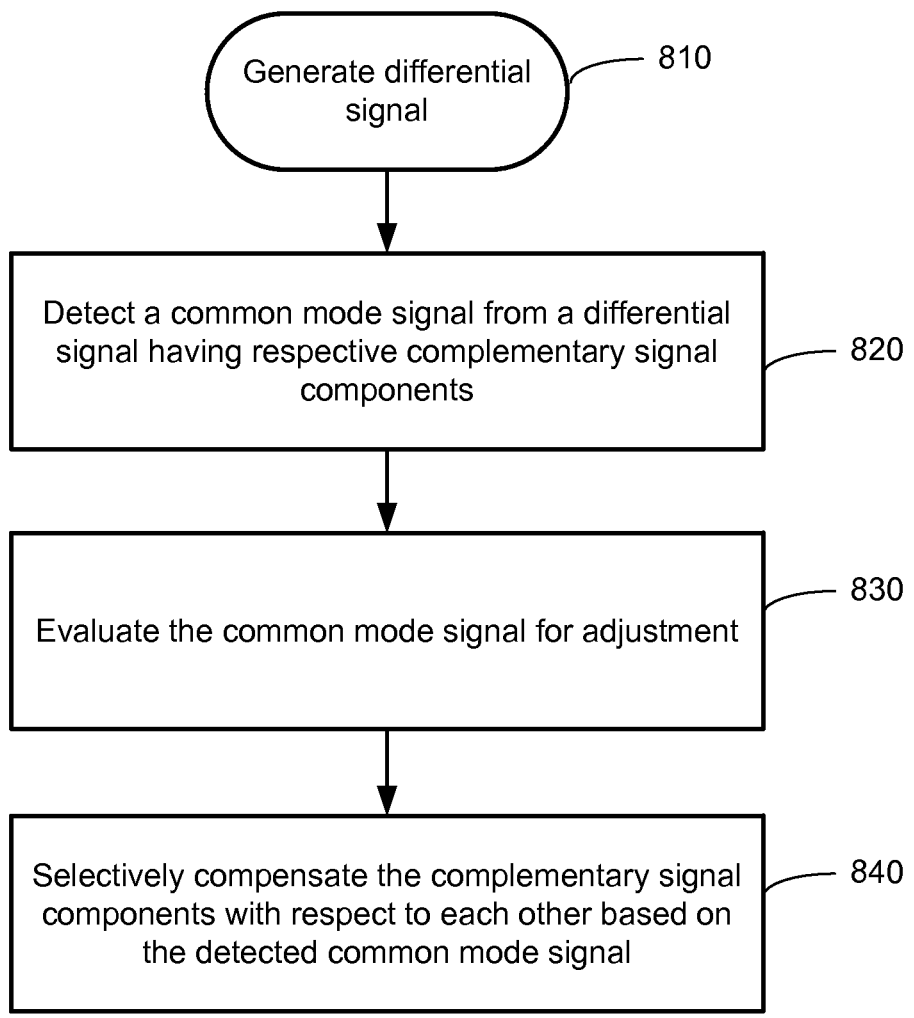
FIG. 8 is a flow diagram illustrating a method of providing interference compensation based on a detected common mode signal.

FIG. 8 is a flow diagram illustrating a method of providing interference compensating based on a detected common-mode signal. With reference back to FIG. 4, an exemplary noise canceling operation of transceiver 400 is now described.

First, a differential signal is generated by differential driver 434 for transmission (810). After experiencing noise interference in the interface circuitry 410, the differential signal becomes distorted (not shown in FIG. 4 for simplicity), and the distortion is picked up by common mode signal detection circuit 420 (820). The distortion then forms a common mode signal 450 on the center tap 428 of common mode signal detection circuit 420, which in turn passes the common mode signal 450 to compensator circuit 430 via common mode path 424. After receiving the common mode signal 450, the control circuitry 432 in compensation circuit 430 evaluates the common mode signal 450 (830), and adjusts a suitable part of the differential driver 434 to generate an adjusted differential signal 452 (840). The pattern of the common mode signal 450 is latched until a new common mode signal pattern is detected by the common mode signal detection circuit 420. Therefore, when the adjusted differential signal 452 travels through the interface circuitry 410 and is interfered by the same noise or imbalance, the interference becomes compensated by the adjustment. In this manner, when the adjusted differential signal 452 reaches transmission port 440, the differential signal ready to be transmitted becomes a balanced differential signal 454 with a flat common mode signal.

In some instances, it may be desirable to detect and compensate for common mode signals before the differential signal is transmitted off-chip. This may occur, for example, in situations where the number of integrated circuit pins and associated signal paths are relatively few, rendering it difficult to employ one or more separate common mode paths for compensation purposes.

Figure 9:
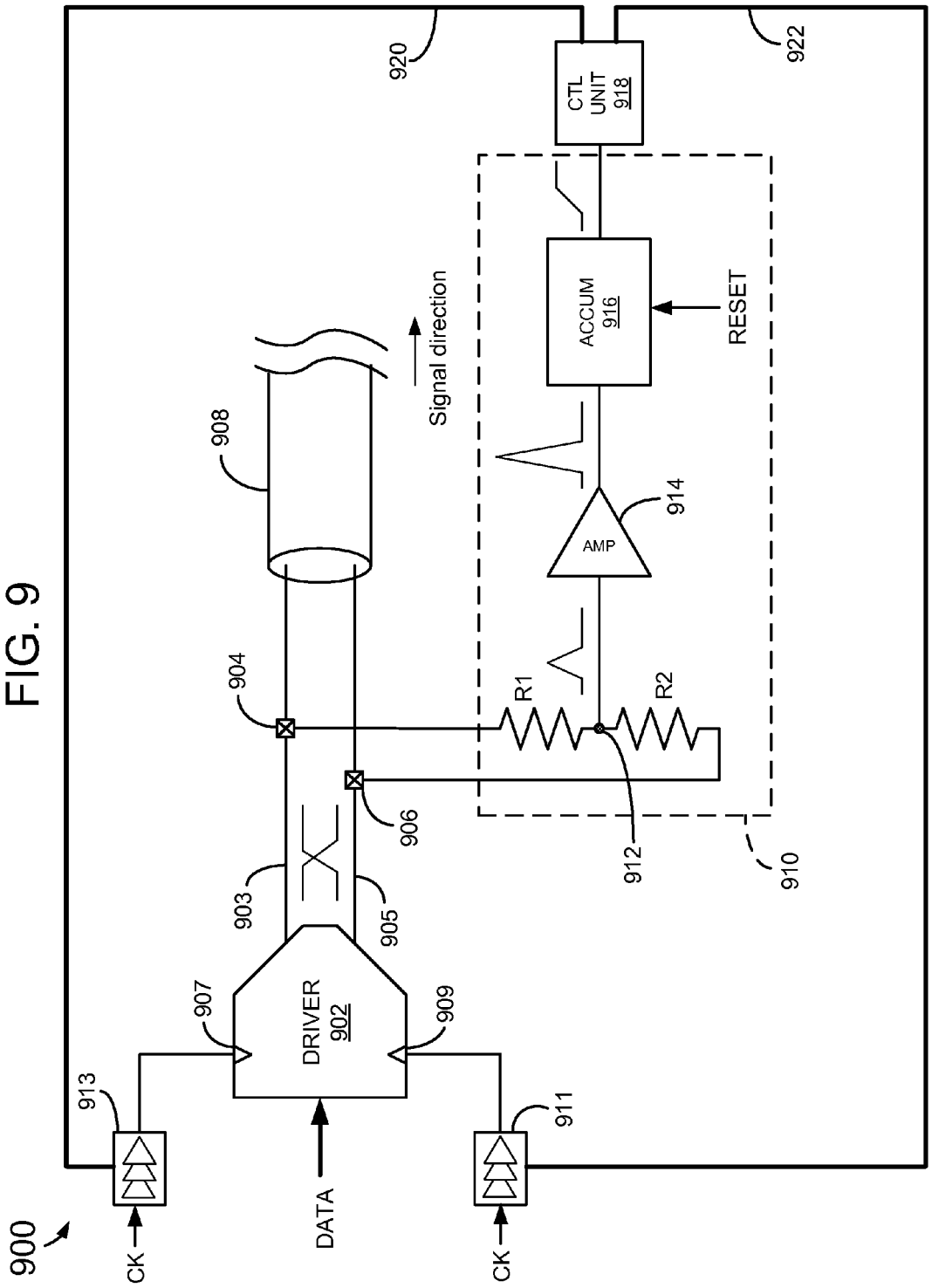
FIG. 9 illustrates one embodiment of a transmit circuit that employs on-chip compensation circuitry to address imbalance in differential signal components.

FIG. 9 illustrates one embodiment of a transmit circuit, generally designated 900 that detects and compensates for common mode signals due to timing imbalances between respective true and complement signal components of a differential signal. The transmit circuit 900 is generally formed on an integrated circuit chip and includes a driver 902 that generates a differential signal having respective true and complement signal components onto respective output paths 903 and 905. The driver includes a data input to receive data DATA, and respective timing inputs at 907 and 909 to receive clock signals CK and /CK that are output from respective adjustable delay circuits 911 and 913, where each clock delay circuit effectively delays either the signal rise or fall transition time at driver output. In one embodiment, the driver 902 may be embodied as a voltage-mode pseudo-differential multi-bit digital-to-analog converter (DAC). While only a single transmit circuit is shown for clarity purposes, a plurality of driver circuits may be provided on a single integrated circuit chip, and one or more of the circuits may employ separate common mode detection and compensation schemes, or share a detection and compensation circuit among several driver circuits.

Ideally, the true and complement components have the same amplitude, rise/fall time, and are exactly 180 degrees out of phase. In reality, imbalances may occur as a result of shifts in the timing of one component relative to the other, creating positive or negative common mode signals. The differential signal is driven to a transmission port that employs true and complement circuit pins or pads 904 and 906 that interface with a transmission medium, such as a multi-conductor cable 908. Transmitted signals that exhibit undesirable levels of common mode may give rise to unacceptable levels of RF emissions as the signals propagate along the transmission medium 908.

Several of the previously described embodiments for detecting the common mode and using the detected common mode to compensate for signal imbalances relied on an additional common mode signaling path or channel that extracted the common mode from a transformer external to the integrated circuit transceiver chip. While this solution works well for its intended applications, in some situations, additional circuit pins or paths may not be available.

Thus, in one embodiment, to detect the common mode signals on-chip, a common mode detector 910 is provided that senses both components of the differential signal, and produces a signal indicative of the level of common mode associated with the differential signal. One embodiment of the detector includes matching impedance branches in the form of resistors R1 and R2. The matching resistors are configured as a voltage divider with a sensing branch coupled to the resistors at a sense node 912. Any imbalance in voltage across the resistors is detected as a common mode signal and fed to a gain amplifier 914. In one embodiment, the gain amplifier boosts the level of the detected signal to full-scale for ease of detection.

Further referring to FIG. 9, the boosted common mode signal output from the gain amplifier 914 is fed to an accumulator circuit 916. In one embodiment, the accumulator circuit takes the form of an analog integrator 916. The integrator generates an integration value based on the received waveform and accumulates the integration value with prior integrated values to form a running accumulation. This is seen more clearly in FIGS. 10A and 10B, where a differential signal waveform is superimposed in time with a common mode voltage waveform, and an integrated voltage waveform output from an integrator. In other embodiments, the accumulation circuit may take the form of a digital accumulator or counter to increment and or decrement depending on the polarity of the detected common mode signal. The output of the integrator 916 is fed to a control unit 918.

With continued reference to FIG. 9, the control unit 918 may be configured in a variety of ways to correct for detected common mode. In one embodiment, the control unit may be programmed with one or more threshold values that represent a maximum accumulated integration value. Other threshold parameters may also be utilized, including values detected over short or long signal transmission intervals. A comparator circuit (not shown) in the control unit compares incoming outputs from the integrator 916 to the threshold value. If the threshold value is exceeded, the control unit 918 generates a control signal that is applied to a selected control path 920 or 922. The control paths provide feedback paths from the control unit 918 to the respective delay circuits 907 and 909. Application of the control signal to one of the delay circuits causes a delay to the clock feeding the corresponding driver timing input. This, in turn, creates an incremental timing adjustment to the relative timing between the differential output signal rise or fall times. With iterative adjustments, detected common mode due to signal component imbalances may be significantly minimized. In some embodiments, the delay circuitry may be employed in the driver 902 to directly delay the differential signal rise or fall transition times with respect to each other (rather than delay the respective clocks for the signal components).

FIGS. 10A and 10B illustrate waveforms that are generated by the transmit circuit described above, and superimposed along the same time scale to show interrelationships therebetween. Referring to FIG. 10A, a differential signal Vdiff is shown with a true signal component 1002 and a complement signal component 1004, where the signals rise times leads the fall times by a duration Δt. The Δt is thus a timing imbalance that gives rise to a level of common mode as the differential signal is transmitted. A detected "positive" common mode waveform Vcom due to the timing imbalance is shown just underneath the differential waveform Vdiff, and shows small levels of signal over the duration of the timing imbalance Δt. An integrated representation of the detected common mode signal is shown by the waveform Vint, and accumulates a running value with each additional occurrence of a detected common mode signal. FIG. 10B illustrates similar waveforms where the signal rise time lags the fall time, resulting in a negative common mode Vcm waveform, and negative accumulation Vint.

In general, correcting imbalance in the differential signal (that gives rise to the detected common mode) may occur in a training mode of operation. As part of a link initialization procedure, certain data patterns may be fed from a transmit end of the link to the receiver end. Detecting the common mode with the above-described on-chip circuitry quickly allows for adjustment to the differential signal components to minimize the common mode, and thus reduce any undesirable RF emissions along the cable. Alternatively, an adaptive adjustment process may be performed continuously or periodically during live data modes of operation.

Figure 11:
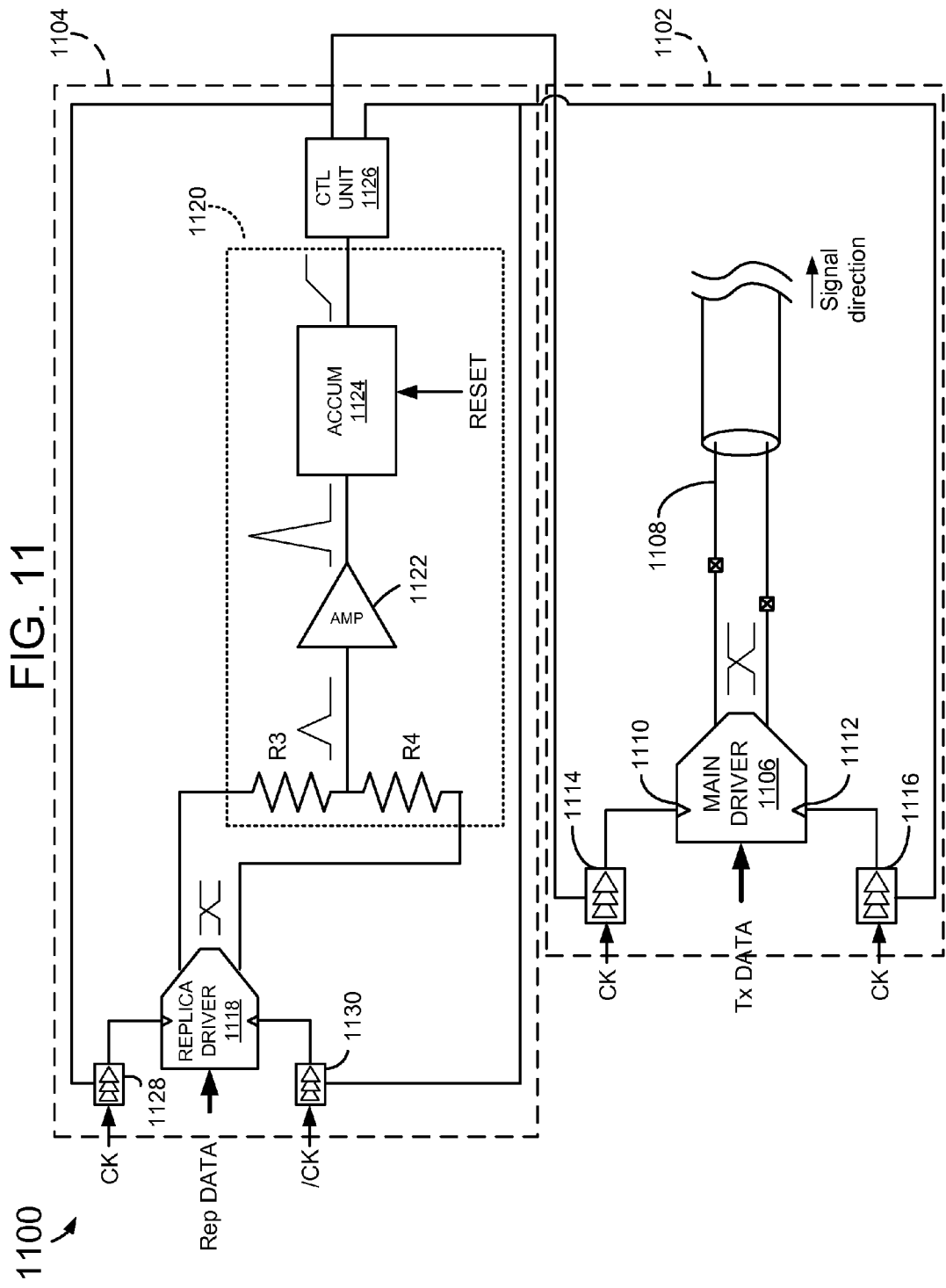
FIG. 11 illustrates an embodiment of a transmit circuit similar to the transmit circuit of FIG. 9, and including a replica branch path.

FIG. 11 illustrates a further embodiment of a transmit circuit, generally designated 1100. The transmit circuit 1100 is similar to that shown in FIG. 9, and includes a main driver circuit 1102 and a replica driver circuit 1104. The main driver circuit 1102 includes a driver 1106 that generates a differential signal for application to a medium such as a cable 1108. The driver receives live input data Tx DATA and has respective timing inputs at 1110 and 1112 responsive to outputs from delay circuits 1114 and 1116 that are driven by respective clock signals CK and /CK. In one embodiment, the driver is embodied as a pseudo-differential 10-bit DAC.

The replica driver circuit 1104 includes a replica driver 1118 that includes circuitry substantially matched to that of the main driver 1106. By "matched", the circuitry generally exhibits drifting electrical parameters depending on temperature variations in the integrated circuit. In one embodiment, the replica driver 1118 may take the form of a sub-driver cell typically used as a most-significant-bit (MSB) of the main driver DAC. The output of the replica driver feeds a common mode detector circuit 1120 that is configured similar to that described in the transmit circuit 900 and shown in FIG. 9. The common mode detector circuit 1120 includes matched impedance branches R3 and R4 that feed a gain amplifier 1122. An accumulator 1124 in the form of an analog integrator or digital counter monitors an aggregate level of detected common mode for application to a control unit 1126.

Further referring to FIG. 11, the control circuit 1126 compares the incoming aggregated common mode from the detector 1120, and if a predetermined threshold level is exceeded, generates a control signal to adjust delay circuits 1128 and 1130 that control the timing of the respective true and complement timing signals CK and /CK fed to the replica driver 1118. The control signal is also fed to one or both of the delay circuits 1114 and/or 1116 associated with the main driver 1106. Slight adjustments to one or both of the delay circuits 129 and/or 130 serve to adjust the detected imbalance causing the common mode. Subsequent detections may fine-tune the imbalance further to reduce the common mode levels to acceptable levels. In some embodiments, the delay circuitry may be configured to directly delay the differential component signals, rather than delay the clock signals.

The use of a replica circuit 1104 in the transmit circuit 1100 enables the timing corrections to be carried out without interfering with signaling occurring over the cable 1108. This may occur, for example, during 10 GBASE-T autonegotiation and/or other link initialization operation that involves data transmissions between link partners over the cable 1108. Since the replica driver circuitry is matched to the main driver circuitry, and exhibits similar drift characteristics during temperature changes, adjustments to the replica delay circuits will have an equal effect on the main driver 1106 when the adjustments are applied to the main driver delay circuits 1114 and 1116.

Those skilled in the art will appreciate the various embodiments provided herein for detecting and compensating for common mode effects that are caused by differential component signal imbalances. With embodiments that provide on-chip detection and correction, spurious RF emissions due to common mode transmissions may be mitigated while maintaining reduced chip pin counts.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated circuit device comprising:
a differential driver to generate a differential signal, the differential signal comprising true and complement signal components that exhibit a relative timing relationship;
a transmission port for delivering the differential signal to a transmission medium;
a common mode detection circuit for detecting a common mode signal associated with the differential signal;
control circuitry to generate a control signal based on the detected common mode signal; and
timing circuitry to adjust the relative timing between the true and the complement signal components based on the control signal.

2. The integrated circuit according to claim 1 wherein:
the differential driver comprises a voltage-mode pseudo-differential driver.

3. The integrated circuit according to claim 1 wherein the common mode detection circuit includes:
first and second impedance circuits having matched impedance values and respectively coupled to the transmission port, the impedance circuits joined at a detection node to form an impedance divider;
wherein the detection node provides a detected waveform indicative of a common-mode exhibited at the transmission port.

4. The integrated circuit according to claim 3 wherein the common mode detection circuit further includes:
a gain amplifier having an input coupled to the detection node and an output to generate an amplified version of the detected waveform; and
an accumulator circuit to receive the detected waveform and generate an accumulation signal, the control signal based on a comparison between the accumulation signal and a predetermined threshold value.

5. The integrated circuit according to claim 4 wherein:
the accumulator circuit comprises an analog integrator.

6. The integrated circuit according to claim 4 wherein:
the accumulator circuit comprises a digital counter.

7. The integrated circuit according to claim 1:
wherein the true signal component is clocked by a first timing reference, and the complement signal component is clocked by a second timing reference; and
wherein the timing circuitry includes an adjustable delay circuit to adjust a timing of one or more of the timing references in response to the control signal.

8. The integrated circuit of claim 1:
wherein the timing circuitry includes an adjustable delay circuit to delay differential signal rise or fall transition times with respect to the other signal component.

9. The integrated circuit of claim 1 wherein the common mode detection circuit is coupled to the transmission port.

10. The integrated circuit of claim 1 wherein the common mode detection circuit comprises:
a replica driver having electrical characteristics that substantially match electrical characteristics exhibited by the differential driver;
first and second impedance circuits having matched impedance values and respectively coupled to the replica driver, the impedance circuits joined at a detection node to form an impedance divider;
a gain amplifier having an input coupled to the detection node and an output to generate an amplified version of the detected waveform; and
an accumulator circuit to receive the detected waveform and generate an accumulation signal, the control signal based on a comparison between the accumulation signal and a predetermined threshold value.

11. A method of reducing radio frequency interference (RFI) emitted by a differential driver, the method comprising:
generating a differential signal having a true signal component and a complement signal component, the differential signal for transmission along a transmission medium;
detecting a level of common mode associated with the generated differential signal prior to transmission on the medium and generating a signal indicative of the detected level;
accumulating the detected common mode signal with previously detected common mode signals to generate a running accumulation value;
comparing the running accumulation value to a predetermined threshold; and
adjusting a relative timing between the true signal component and the complement signal component if the predetermined threshold is exceeded.

12. The method according to claim 11 wherein the detecting, accumulating, comparing and adjusting are carried out by circuitry formed on a common integrated circuit chip.

13. The method of claim 11 wherein the detecting comprises:
sensing the differential signal and generating a signal representative of the common mode through an impedance network;
amplifying the signal representative of the common mode;
accumulating the signal representative of the common mode with prior detected signals to generate an accumulation value; and
generating a control signal if the accumulation value exceeds a predetermined threshold.

14. The method according to claim 11, wherein the true and complement signal components are responsive to respective clock signals, and the adjusting a relative timing between the true and complement signals comprises:
delaying one or both of the respective clock signals.

15. The method according to claim 11 wherein accumulating comprises integrating the signal representative of the common mode.

16. The method according to claim 11 wherein accumulating comprises incrementing a count based on detections of the signal representative of the common mode.

17. The method of claim 11 wherein the detecting comprises:
generating a replica differential signal that exhibits electrical parameters that substantially track electrical parameters associated with the differential signal;
sensing the replica differential signal and detecting a signal representative of the common mode through an impedance network;
amplifying the signal representative of the common mode;
accumulating the signal representative of the common mode with prior detected signals to generate an accumulation value;
generating a control signal if the accumulation value exceeds a predetermined threshold; and
adjusting the relative timing based on the common mode signal detected from the generation of the replica differential signal.

18. The method according to claim 17 wherein accumulating comprises integrating the signal representative of the common mode.

19. The method according to claim 17 wherein accumulating comprises incrementing a count based on detections of the signal representative of the common mode.

20. A differential driver circuit formed on an integrated circuit chip, the differential driver circuit comprising:
- a voltage-mode differential driver to generate a differential signal, the differential signal comprising true and complement signal components that exhibit a relative timing relationship;
- respective true and complement signal pins for delivering the true and complement signal components to a transmission medium;
- a common mode detection circuit coupled to the true and complement signal pins for detecting a common mode signal associated with a timing imbalance between the true and complementary signal components, the common mode detection circuit including
  - a replica driver having electrical characteristics that substantially match electrical characteristics exhibited by the differential driver;
  - first and second impedance circuits having matched impedance values and respectively coupled to the replica driver, the impedance circuits joined at a detection node to form an impedance divider;
  - a gain amplifier having an input coupled to the detection node and an output to generate an amplified version of the detected waveform; and
  - an accumulator circuit to receive the detected waveform and generate an accumulation signal, the control signal based on a comparison between the accumulation signal and a predetermined threshold value; and
- timing circuitry to adjust the relative timing relationship between the true and the complement signal components based on the control signal.

* * * * *